(12) United States Patent
Carrington

(10) Patent No.: US 11,407,494 B2
(45) Date of Patent: Aug. 9, 2022

(54) PITCH CONTROL ASSEMBLY

(71) Applicant: GE Aviation Systems Limited

(72) Inventor: Christopher Roy Carrington, Gloucestershire (GB)

(73) Assignee: GE Aviation Systems Limited, Gloucestershire (GB)

( * ) Notice: Subject to any disclaimer, the term of this patent is extended or adjusted under 35 U.S.C. 154(b) by 335 days.

(21) Appl. No.: 16/541,726

(22) Filed: Aug. 15, 2019

(65) Prior Publication Data

US 2019/0367159 A1    Dec. 5, 2019

Related U.S. Application Data

(63) Continuation of application No. 15/027,801, filed as application No. PCT/GB2013/052602 on Oct. 7, 2013, now Pat. No. 10,384,763.

(51) Int. Cl.

| B64C 11/38 | (2006.01) |
| B64C 11/42 | (2006.01) |
| B64C 11/30 | (2006.01) |
| B64C 11/40 | (2006.01) |

(52) U.S. Cl.
CPC ............ *B64C 11/38* (2013.01); *B64C 11/301* (2013.01); *B64C 11/385* (2013.01); *B64C 11/40* (2013.01); *B64C 11/42* (2013.01)

(58) Field of Classification Search
CPC ....... B64C 11/38; B64C 11/385; B64C 11/42; B64C 11/301; B64C 11/40; F01D 7/00; F05D 2260/74; F05D 2260/79

USPC ...... 416/61, 157 R, 157 A, 157 B, 163, 164, 416/167, 168 A
See application file for complete search history.

(56) References Cited

U.S. PATENT DOCUMENTS

| 3,054,458 | A | 9/1962 | Corrado |
| 5,186,608 | A | 2/1993 | Bagge |
| 5,779,446 | A | 7/1998 | Althof et al. |
| 5,836,742 | A | 11/1998 | Carvalho et al. |
| 5,836,743 | A | 11/1998 | Carvalho et al. |
| 6,059,528 | A | 5/2000 | Danielson |
| 7,758,310 | B2 | 7/2010 | Cotton et al. |
| 8,277,182 | B2 | 10/2012 | Perkinson |
| 10,384,763 | B2 * | 8/2019 | Carrington ............. B64C 11/42 |
| 2003/0000298 | A1 | 1/2003 | Perkinson |
| 2007/0021222 | A1 | 1/2007 | Perkinson |
| 2011/0017103 | A1 | 7/2011 | Swift |

FOREIGN PATENT DOCUMENTS

| EP | 2261115 A2 | 12/2010 |
| EP | 2117928 B1 | 5/2013 |
| GB | 2260821 A | 4/1993 |
| WO | 9822340 A1 | 5/1998 |

* cited by examiner

*Primary Examiner* — Christopher Verdier
(74) *Attorney, Agent, or Firm* — McGarry Bair PC

(57) ABSTRACT

A method of controlling a propeller assembly, having a blade, piston end cap, and piston, with a pitch control unit, having a transfer bearing and a blade angle unit, the method comprising: axially moving a transfer tube relative to and circumscribing the transfer bearing, and sensing an axial movement of the transfer tube with the blade angle unit.

15 Claims, 6 Drawing Sheets

PITCH CONTROL ASSEMBLY

CROSS REFERENCE TO RELATED APPLICATION

The present application is a continuation of U.S. patent application Ser. No. 15/027,801, filed Apr. 7, 2016, now U.S. Pat. No. 10,384,763, which claims priority to the prior filed, PCT Application Serial No. PCT/GB13/052602, filed Oct. 7, 2013, both of which are incorporated herein by reference in their entirety.

BACKGROUND

Contemporary propeller assemblies may have a means of varying the blade pitch via a pitch control unit (PCU), to optimize efficiency of thrust delivery. In this manner, the propeller may be designed to vary pitch in flight, to give optimum thrust, from takeoff and climb to cruise. Varying the pitch angle may allow the aircraft to maintain an optimal angle of attack or maximum lift to drag ratio on the propeller blades as aircraft speed varies.

BRIEF DESCRIPTION

In one aspect, the disclosure relates to a method of controlling a propeller assembly, having a blade, piston end cap, and piston, with a pitch control unit, having a transfer bearing and a blade angle unit, the method comprising: axially moving a transfer tube relative to and circumscribing the transfer bearing, sensing an axial movement of the transfer tube with the blade angle unit, where the blade angle unit comprises a series of coils radially spaced from and circumscribing at least a portion of the transfer tube, and determining a pitch angle of the blade based on the sensed movement of the transfer tube.

In another aspect the disclosure relates to a method of adjusting a pitch angle of a blade with a pitch control unit having a transfer bearing and a blade angle unit, the method comprising: axially moving a transfer tube relative to and circumscribing the transfer bearing, sensing an axial movement of the transfer tube with the blade angle unit, where the blade angle unit comprises a series of coils radially spaced from and circumscribing the transfer tube, determining the pitch angle of the blade based on the sensed movement, and outputting a pitch angle value.

DETAILED DESCRIPTION

Figure 1:
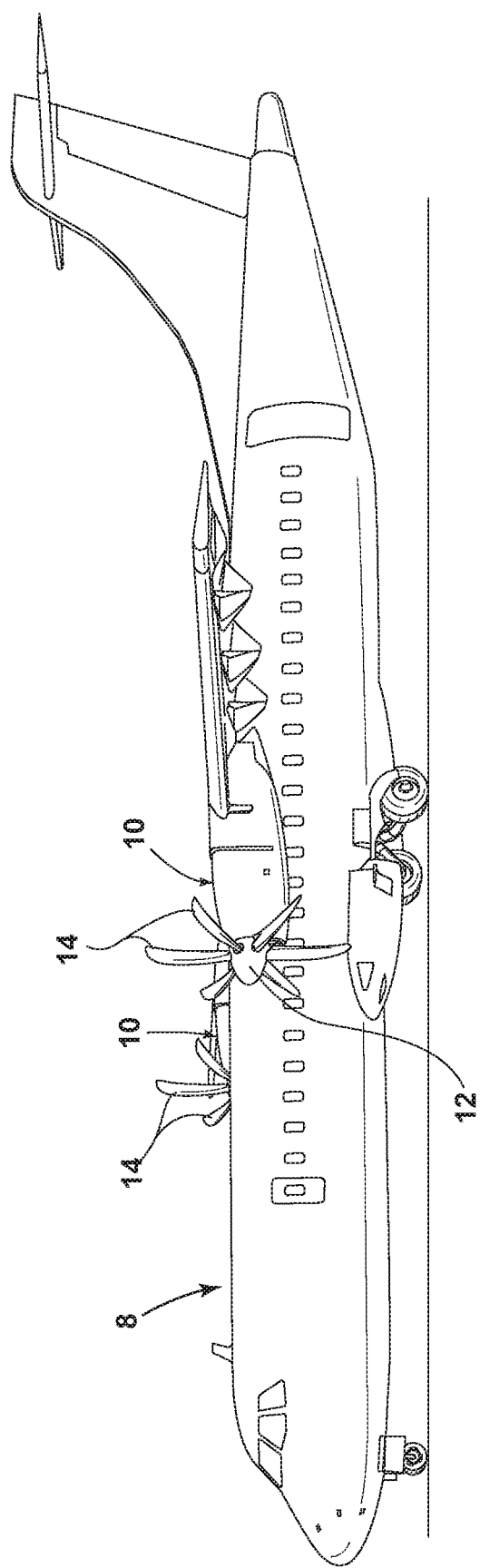
FIG. 1 is a schematic view of an aircraft having variable pitch propellers.
Figure 2:
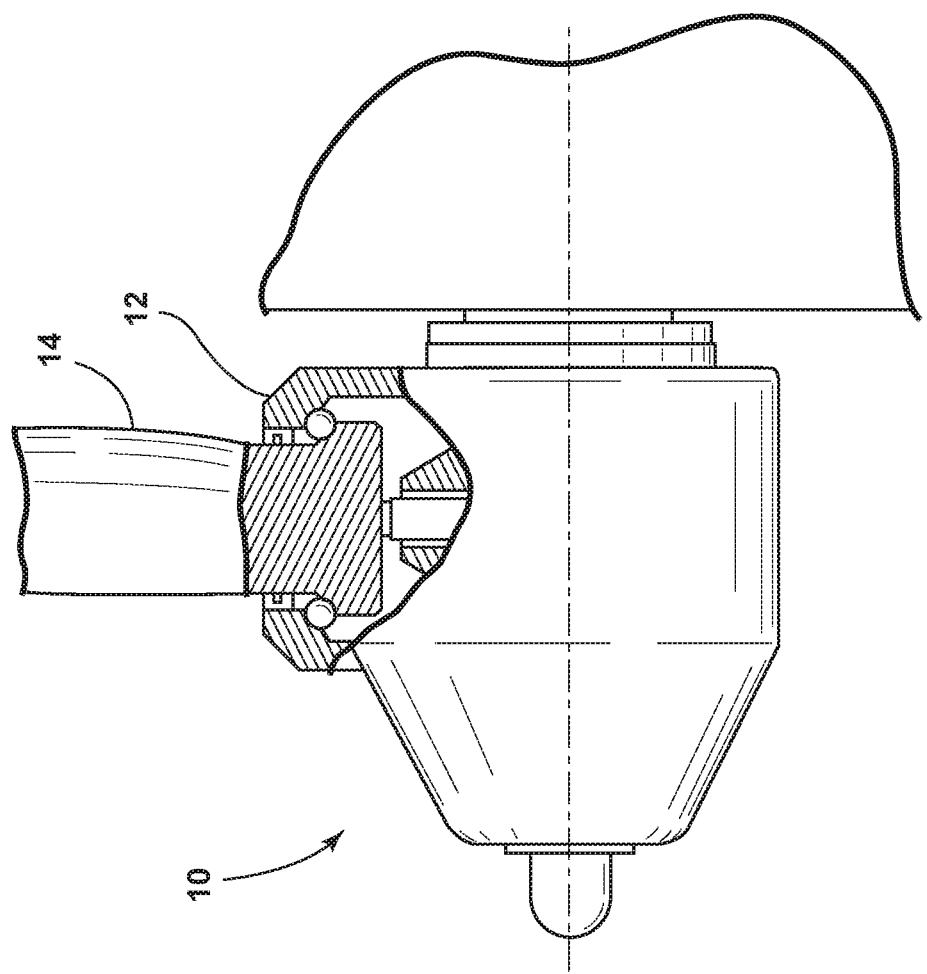
FIG. 2 is a schematic view of a propeller assembly having a variable pitch propeller.
Figure 3:
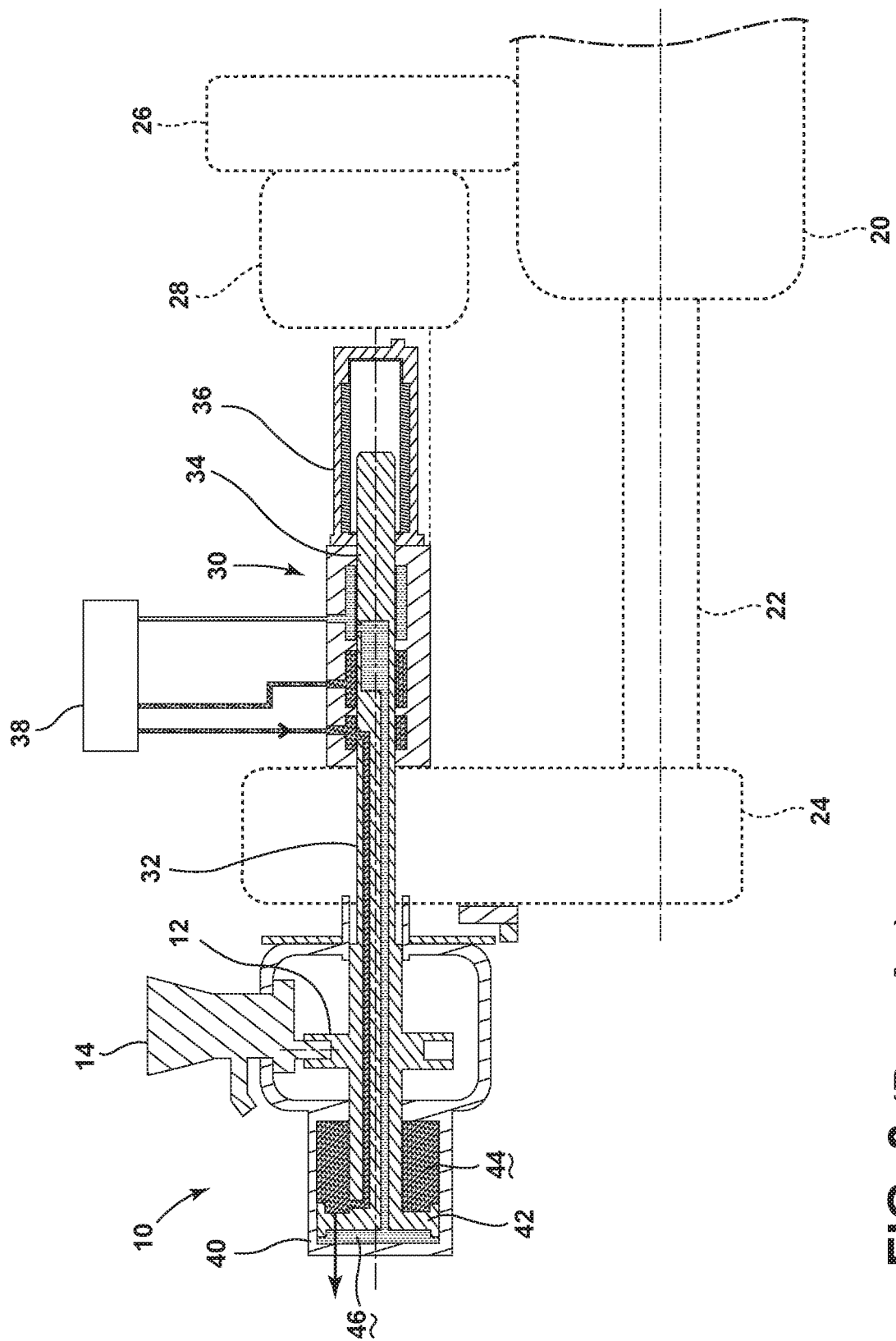
FIG. 3 is a schematic illustration of an exemplary variable pitch propeller assembly and a prior art pitch control unit.

FIG. 1 illustrates an aircraft 8 having multiple propeller assemblies 10 each having a hub 12 and multiple blades 14. While one example of an aircraft has been illustrated it will be understood that any suitable aircraft may utilize embodiments of the innovation described herein. FIG. 2 schematically illustrates a propeller assembly having a hub and only a single blade illustrated. While a plurality of circumferentially spaced blades 14 may be supported within the hub 12 as illustrated in FIG. 1, only one blade is illustrated in the remaining figures for clarity purposes. As illustrated in FIG. 3, the hub 12 and the multiple blades 14 may be operably coupled to a suitable propulsion plant, such as an engine 20, through a drive shaft 22 and a gearbox 24. As illustrated, the propeller assembly 10 may be mounted on the propeller gearbox 24. An accessory gear box 26 and a generator 28 are also illustrated as being located adjacent the propeller assembly 10 and pitch control unit 30.

Each blade 14 may be adjustable for pitch during rotation of the propeller assembly 10 under the control of a pitch control unit (PCU) 30; a prior art PCU 30 is schematically included in FIG. 3. Hydraulic lines may be ported along a hydraulic transfer tube arrangement 32 from the PCU 30 mounted on the back of the gearbox 24. The PCU 30 houses a hydraulic transfer bearing 34 and a blade angle unit 36. Conventionally, the hydraulic transfer bearing 34 and the blade angle unit 36 are placed in series resulting in considerable unit length. The PCU 30 may also include a number of control valves 38 that may allow hydraulic fluid to be transferred through the hydraulic transfer tube arrangement 32 to portions of a piston end cap 40.

The piston end cap 40 houses a piston 42, which may be moved depending on where hydraulic fluid is introduced into the piston end cap 40. For example, if hydraulic fluid is introduced into a first portion 44 of the piston end cap 40 the piston 42 is moved towards a fine pitch direction, which reduces a pitch of the blades 14. Conversely, if hydraulic fluid is introduced into a second portion 46 of the piston end cap 40 the piston 42 is moved towards a coarse pitch direction, which increases the pitch of the blades 14. As the piston 42 moves, the propeller hub 12 is moved backwards and forwards and the pitch of the blades 14 attached thereto are moved.

Figure 4:
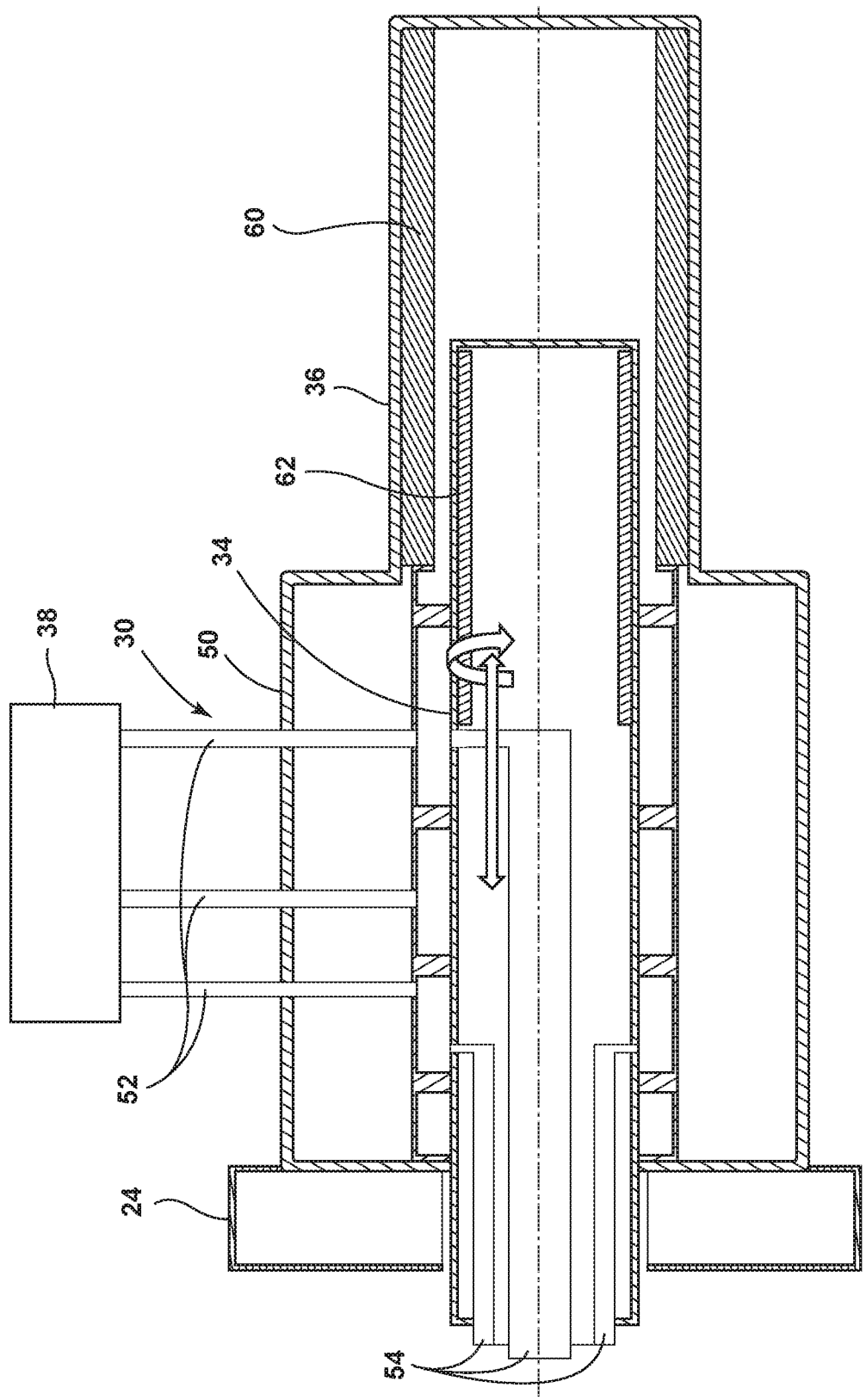
FIG. 4 is a cross-sectional view of the prior art pitch control unit illustrated in FIG. 3.

As illustrated more clearly in FIG. 4, the prior art propeller PCU 30 houses the hydraulic transfer bearing 34 and the blade angle unit 36 in series. The PCU 30 may include a housing 50 that extends around at least a portion of the hydraulic transfer bearing 34 and the blade angle unit 36. The conventional PCU 30 may be approximately 14 inches in length. Hydraulic lines 52 may be included within the housing 50 and may be fluidly coupled to hydraulic lines 54 within the hydraulic transfer bearing 34. The blade angle unit 36 may include a series of coils 60 that may measure a magnetic core sleeve 62 located on at least a portion of the hydraulic transfer bearing 34. In this manner, the blade angle unit 36 may measure the axial position of the end of the hydraulic transfer bearing 34 and the propeller blade angle may be calculated therefrom.

Figure 5:
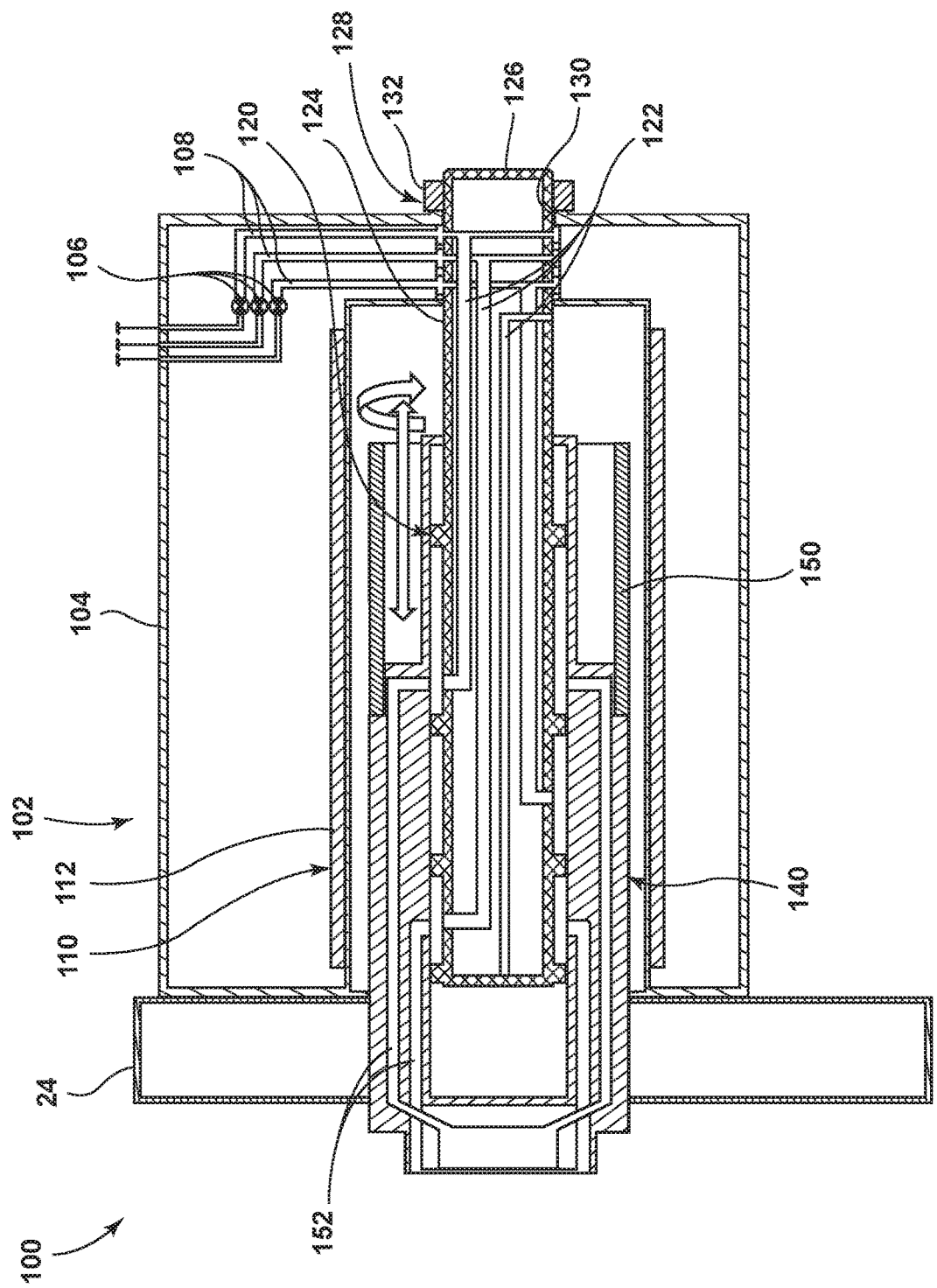
FIG. 5 is a cross-sectional view of a pitch control assembly according to various aspects described herein.

FIG. 5 illustrates one embodiment of a pitch control assembly (PCU) 100 according to the innovation, which provides a relatively compact length, unlike the prior art, sequentially arranged PCU 30. As seen in the cross-sectional view of FIG. 5, the pitch control assembly 100 includes a pitch control unit 102 having a housing 104, with a plurality of control valves 106 and corresponding hydraulic lines 108 located within the housing 104. A blade angle unit 110 may include a series of coils 112 located within the housing 104. At least a portion of the series of coils 112 may be located within the housing 104 including that the entire series of coils 112 may be located within the housing 104.

A transfer bearing 120 may be mounted to the housing 104 and have at least a portion located within the transfer tube 140. A plurality of hydraulic lines 122 within the transfer bearing 120 may be fluidly coupled to the hydraulic lines 108 of the pitch control unit 102.

The hydraulic lines 108 within the housing 104 and the hydraulic lines 122 within the transfer bearing 120 may include at least a fine hydraulic line and a coarse hydraulic line. In the illustrated example, a ground fine hydraulic line for reducing the pitch of the blades 14 when the aircraft 8 is on the ground, a flight fine hydraulic line for reducing the pitch of the blades 14 when the aircraft 8 is in flight, and a coarse hydraulic line for increasing the pitch of the blades 14 have been included.

The transfer bearing 120 may be formed in any suitable manner including that it may include a mandrel 124. The hydraulic lines of the transfer bearing 120 may be located internally of the mandrel 124. The mandrel 124 may have one end 126 mounted to the housing 104 to mount the transfer bearing 120 to the housing 104. By way of non-limiting example, an axial adjuster 128 may mount the mandrel 124 to the housing 104 to enable relative axial movement of the mandrel 124 and the housing 104. This may provide a quick and simple propeller rigging feature that is much faster than the conventional way, which is achieved by an adjustment procedure that includes removal of the propeller spinner and the pitch change piston end cap and requires a much longer period of time. By way of further example, the axial adjuster 128 may include a threaded end on the mandrel 124 passing through an opening 130 in the housing 104 and a lock nut 132 threaded onto the threaded end to lock the mandrel 124 relative to the housing 104. While the mandrel 124 is illustrated as including a smooth end it will be understood that the end 126 of the mandrel 124 may be threaded.

A transfer tube 140 may axially receive and be axially moveable relative to at least a portion of the transfer bearing 120. The transfer tube 140 may both rotate and translate around the mandrel 124. More specifically, the axial movement of the transfer tube 140 may result in its rotation. A magnetic core sleeve 150 may be carried by the transfer tube 140 and may be located within the series of coils 112. The magnetic core sleeve 150 may be carried by the transfer tube 140 in any suitable manner including that the magnetic core sleeve 150 may fit onto a portion of the transfer tube 140. Thus, the magnetic core sleeve 150 moves with the transfer tube 140. As illustrated, at least a portion of each of the transfer bearing 120, the transfer tube 140, and the magnetic core sleeve 150 may be located within the series of coils 112. It is contemplated that the entire magnetic core sleeve 150 may be located within the series of coils 112 throughout an operational axial range of movement of the transfer tube 140. Hydraulic lines 152 may be included in the transfer tube 140 and may provide fluid to a piston end cap of the propeller assembly.

Figure 6:
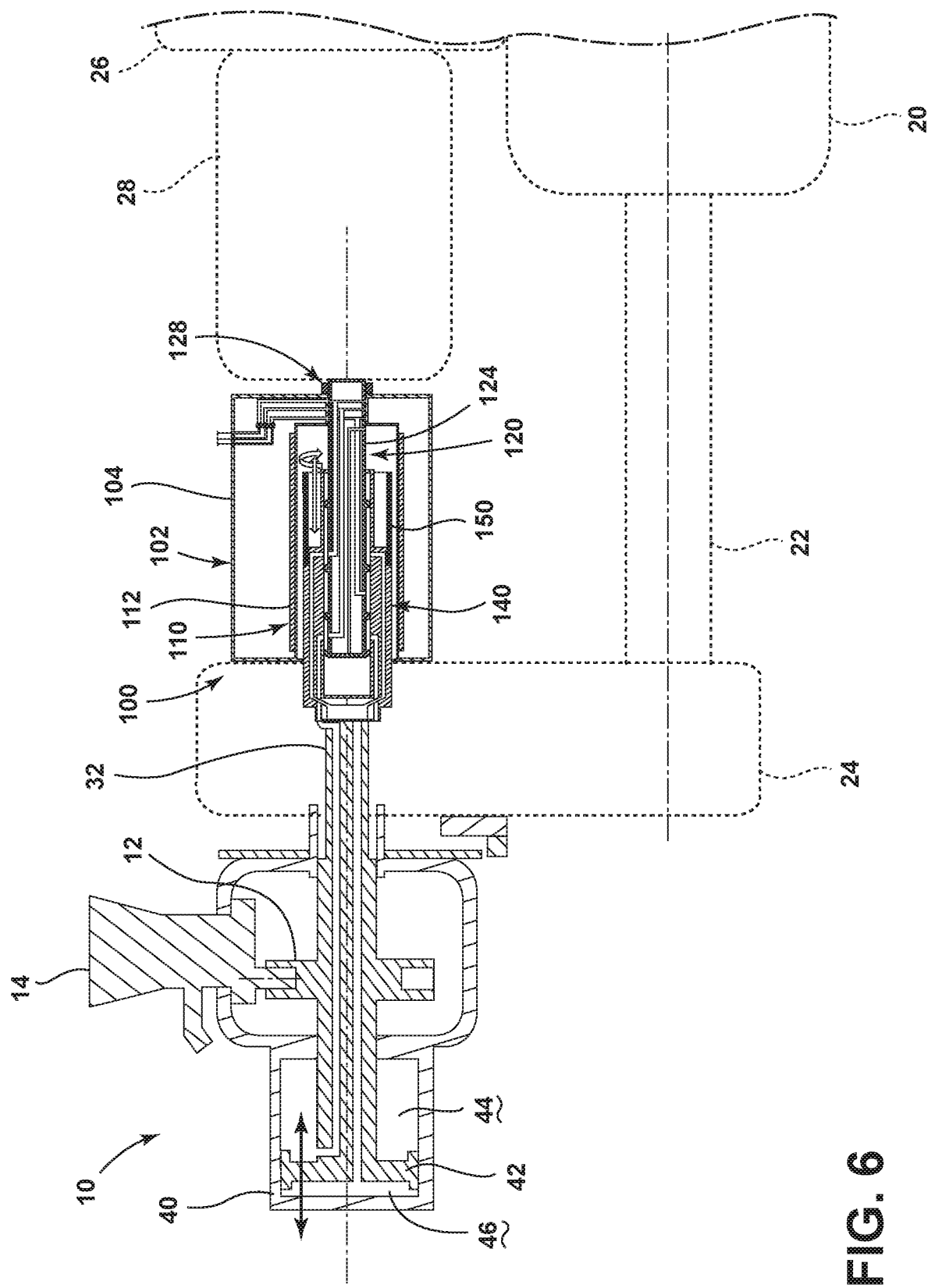
FIG. 6 is a schematic illustration of the pitch control assembly of FIG. 5 included within an exemplary variable pitch propeller assembly.

During operation, a pitch angle of the propeller may be controlled by axially moving the transfer tube 140 relative to the transfer bearing 120 in response to fluid supplied through the hydraulic lines 108, 122, and 152 in response to the actuation of the control valves 106, and the blade angle unit 110 senses the corresponding axial movement of the magnetic core sleeve 150 within the series of coils 112 and provides an output indicative of the amount of blade angle movement. More specifically, the series of coils 112 may measure the magnetic core sleeve 150 mounted on the transfer tube 140. In this manner, the blade angle unit 110 may measure the axial position of the end of the transfer bearing 140 and the propeller blade angle may be calculated therefrom. In this manner, the feedback feature may be positioned around the transfer tube 140 instead of being on the end such that the length of the pitch control assembly 100 is almost halved compared to conventional PCUs. It will be understood that the pitch control assembly 100 may be located adjacent the propeller gearbox and may be incorporated into any suitable propeller assembly including the propeller assembly previously described above. FIG. 6 illustrates the pitch control assembly incorporated into the propeller assembly previously described for exemplary purposes. Thus, during operation, fluid may be provided through hydraulic lines 108, 122, and 152 such that hydraulic fluid is introduced into either the first portion 44 of the piston end cap 40 and the piston 42 is moved towards a fine pitch direction, which reduces a pitch of the blades 14 or hydraulic fluid is introduced into the second portion 46 of the piston end cap 40 and the piston 42 is moved towards a coarse pitch direction, which increases the pitch of the blades 14. As the piston 42 moves, the transfer tube 140 moves axially in the same direction around the mandrel 124.

As may also be seen in FIG. 6, the length of the pitch control assembly 100 is much shorter than that of the prior art unit and may be approximately 8 inches in length. This allows for a larger generator 28 to be included in the nacelle. This may prove beneficially as aircraft are demanding more electrical power to be generated by the propulsion system. Such an increase may otherwise be difficult to accommodate within the engine nacelle.

The embodiments described above provide for a variety of benefits including that the length of the assembly is much shorter than conventional units, which offers significant advantages in terms of system installation and weight. As compared to conventional PCUs, embodiments of the innovation allow the electromagnetic blade angle unit coils to be placed around the inverted hydraulic transfer bearing, which almost halves the length of the assembly. As the pitch control assembly is subject to an aggressive vibration field, the shorter length is better suited to this environment, as it is less susceptible to vibration, and results in increased reliability. Further, embodiments of the innovation also dramatically reduce hydraulic transfer bearing rigging procedure as the embodiments allow quick, external access for rigging, which significantly reduces maintenance costs. Contemporary propeller systems locate the propeller rigging adjuster on the propeller crosshead at the front of the propeller, which requires the propeller spinner and the piston end cap to be removed for access. Embodiments of the innovation allow rigging to be undertaken on the end of the pitch control unit and provide a simple external adjustment.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a propeller assembly, having a blade, piston end cap, and piston, with a pitch control unit, having a transfer bearing and a blade angle unit, the method comprising:

axially moving a transfer tube relative to and circumscribing the transfer bearing;

sensing with the blade angle unit an axial movement of the transfer tube with respect to the blade angle unit, where the blade angle unit comprises a series of coils radially spaced from and circumscribing at least a portion of the transfer tube;

sensing with the blade angle unit a magnetic field between a magnetic element carried by the transfer tube and a series of coils; and determining a pitch angle of the blade based on the axial movement of the transfer tube;

wherein at least a portion of each of the transfer bearing, transfer tube, and magnetic element is within the series of coils.

2. The method of claim 1, further comprising comparing the pitch angle to a required pitch angle.

3. The method of claim 2, further comprising actuating a control valve to supply a fluid into the transfer bearing to adjust the pitch angle of the blade.

4. The method of claim 3, further comprising flowing the fluid to a first portion of the piston end cap to move the piston toward a coarse pitch direction.

5. The method of claim 3, further comprising flowing the fluid to a second portion of the piston end cap to move the piston toward a fine pitch direction.

6. The method of claim 3, wherein supplying a fluid further comprises supplying the fluid through at least one hydraulic line disposed within the transfer bearing.

7. The method of claim 6, wherein the transfer bearing includes a mandrel and the at least one hydraulic line is disposed within the mandrel.

8. The method of claim 1, wherein sensing the axial movement of the transfer tube further comprises determining with the blade angle unit an axial movement of the magnetic element with respect to the series of coils.

9. The method of claim 8, wherein an entire body of the magnetic element is located within the series of coils throughout an operational axial range of movement of the transfer tube.

10. A method of adjusting a pitch angle of a blade with a pitch control unit having a transfer bearing and a blade angle unit, the method comprising: axially moving a transfer tube relative to and circumscribing the transfer bearing, sensing an axial movement of the transfer tube with the blade angle unit, where the blade angle unit comprises a series of coils radially spaced from and circumscribing the transfer tube, determining the pitch angle of the blade based on the sensed movement, and outputting with the blade angle unit an amount of blade angle movement;

wherein sensing the axial movement of the transfer tube further comprises determining with the blade angle unit an axial movement of a magnetic sleeve axially extending from and carried by the transfer tube with respect to the series of coils; and wherein at least a portion of each of the transfer bearing, transfer tube, and magnetic sleeve is within the series of coils.

11. The method of claim 10, further comprising comparing the pitch angle value to a required pitch angle.

12. The method of claim 11, further comprising actuating a control valve for supplying a fluid into the transfer bearing to adjust the pitch angle of the blade.

13. The method of claim 12, wherein supplying a fluid further comprises supplying the fluid through at least one hydraulic line disposed within the transfer bearing.

14. The method of claim 13, wherein the transfer bearing includes a mandrel and the at least one hydraulic line is disposed within the mandrel.

15. The method of claim 10, wherein an entire body of the magnetic sleeve is located within the series of coils throughout an operational axial range of movement of the transfer tube.

* * * * *